US010369948B2

(12) United States Patent
Kohlmann et al.

(10) Patent No.: US 10,369,948 B2
(45) Date of Patent: Aug. 6, 2019

(54) SUPPORT ASSEMBLY OF A BUMPER ON A FRONT MODULE OF A MOTOR VEHICLE

(71) Applicant: Daimler AG, Stuttgart (DE)

(72) Inventors: Uwe Kohlmann, Filderstadt-Harthausen (DE); Anton Nelson, Herrenberg (DE)

(73) Assignee: Daimler AG, Stuttgart (DE)

( * ) Notice: Subject to any disclaimer, the term of this patent is extended or adjusted under 35 U.S.C. 154(b) by 4 days.

(21) Appl. No.: 14/889,759

(22) PCT Filed: Apr. 12, 2014

(86) PCT No.: PCT/EP2014/000995
§ 371 (c)(1),
(2) Date: Nov. 6, 2015

(87) PCT Pub. No.: WO2014/180531
PCT Pub. Date: Nov. 13, 2014

(65) Prior Publication Data

US 2016/0101754 A1 Apr. 14, 2016

(30) Foreign Application Priority Data

May 7, 2013 (DE) ........................ 10 2013 007 896

(51) Int. Cl.
*B60R 19/50* (2006.01)
*B60Q 1/04* (2006.01)
*B60R 19/18* (2006.01)

(52) U.S. Cl.
CPC ............ *B60R 19/50* (2013.01); *B60Q 1/0408* (2013.01); *B60Q 1/0483* (2013.01); *B60R 2019/1886* (2013.01)

(58) Field of Classification Search
CPC ....... B60R 19/44; B60R 19/445; B60R 19/46; B60R 19/50; B60R 2019/505;
(Continued)

(56) References Cited

U.S. PATENT DOCUMENTS 6,357,821 B1 * 3/2002 Maj ....................... B60Q 1/0035 296/193.09
7,607,723 B2 * 10/2009 Bierjon ................ B62D 25/084 296/203.02

(Continued)

FOREIGN PATENT DOCUMENTS

DE 10031369 A1 * 1/2002 ........... B60Q 1/0064
DE 102 37 454 B3 2/2004

(Continued)

OTHER PUBLICATIONS

Gottfried, Front end module for vehicle has auxiliary element extending upwards from transverse bumper (fender) carrier, Feb. 4, 2004, Patent DE 10237454 B3; Google Patents, https://patents.google.com/patent/DE10237454B3/en.*

(Continued)

*Primary Examiner* — Anh T Mai
*Assistant Examiner* — Michael Chiang
(74) *Attorney, Agent, or Firm* — Crowell & Moring LLP

(57) ABSTRACT

A support assembly of a bumper on a front end region of a motor vehicle which has a front end beam with respective headlights supported thereon and which each have a headlight housing, and which has a bumper cladding of the bumper which is supported by at least one bumper beam, is disclosed. The bumper beam is supported via at least one respective support element on the respectively allocated headlight housing of the respectively allocated headlight. Also disclosed is a headlight having a headlight housing which includes at least one receiver on which an allocated support element of a bumper is able to be supported. A method for the production of such a support assembly is also disclosed.

12 Claims, 2 Drawing Sheets

(58) Field of Classification Search
CPC ...... B60Q 1/0408–0441; B60Q 1/0475; B60Q 1/0483; B60Q 1/0491
USPC ................ 362/505, 546; 296/193.01, 203.02
See application file for complete search history.

(56) References Cited

U.S. PATENT DOCUMENTS

| | | | | |
|---|---|---|---|---|
| 8,197,108 | B2 | 6/2012 | Eckert et al. | |
| 2005/0134092 | A1 * | 6/2005 | Lazzeroni ............ | B62D 25/084 296/203.01 |
| 2009/0267364 | A1 | 10/2009 | Crainic et al. | |
| 2009/0315345 | A1 * | 12/2009 | Eckert .................. | B60Q 1/0416 293/117 |

FOREIGN PATENT DOCUMENTS

| | | | | |
|---|---|---|---|---|
| DE | 10237454 | B3 * | 2/2004 | ........... B60Q 1/0408 |
| DE | 10 2004 012 551 | A1 | 11/2005 | |
| DE | 10 2005 045 086 | A1 | 4/2007 | |
| DE | 10 2006 023 803 | A1 | 11/2007 | |
| DE | 10 2007 030 513 | A1 | 2/2008 | |
| DE | 10 2008 038 884 | A1 | 4/2009 | |
| DE | 10 2009 011 898 | A1 | 10/2009 | |
| EP | 2 266 865 | A2 | 12/2010 | |
| FR | 2 871 432 | A1 | 12/2005 | |

OTHER PUBLICATIONS

Nitsche, ttachment arrangement for lighting module on motor vehicle has module joined in one piece to body part (fender cladding), movable with part between operating, non-operating positions, Jan. 10, 2002, Patent Pub DE10031369A1; Google Patents, https://patents.google.com/patent/DE10031369A1/en.*

PCT/EP2014/000995, International Search Report (PCT/ISA/220 and PCT/ISA/210) dated Jul. 2, 2014, with partial English translation, enclosing Written Opinion of the International Searching Authority (PCT/ISA/237) (Fourteen (14) pages).

German Office Action dated Jan. 10, 2014 (Seven (7) pages).

* cited by examiner

SUPPORT ASSEMBLY OF A BUMPER ON A FRONT MODULE OF A MOTOR VEHICLE

BACKGROUND AND SUMMARY OF THE INVENTION

The invention relates to a support assembly of a bumper on a front module of a motor vehicle. Furthermore, the invention relates to a headlight. Finally, the invention relates to a method for producing such a support assembly of a bumper on a front module of a motor vehicle.

In such support assemblies, it is generally desirable that, in particular, a bumper cladding of the bumper conclude exactly with headlights which are adjacent to this on the front end of the motor vehicle, and indeed preferably with relatively low gap dimensions. Furthermore, in particular, a sufficient support of the bumper or of the bumper cladding in the vehicle vertical direction is desirable in order to not obtain, even during continuous use of the motor vehicle, setting or lowering of the bumper cladding compared to the respectively associated headlight. This would, in particular, influence the optical appearance of the vehicle front in a disadvantageous manner, and additionally, for example, would allow the entry of water, dirt or similar via an gap arising between the bumper cladding and the respective headlight. Finally, an assembly of the bumper on the front module of the motor vehicle which is as simple as possible is desirable in order to achieve a cost-efficient production.

A headlight having a headlight housing emerges from DE 10 2005 045 086 A1, to which a bumper beam supporting a bumper cladding is firmly screwed, which is arranged below the headlight. For this purpose, the bumper beam has elongated holes with which the screws of the screw connection engage and are screwed into a thread provided in the headlight housing on the other side. The definitive position of the bumper beam relatively opposite the headlight is therefore only then achieved if the bumper beam has occupied a determined position in the vehicle longitudinal or transverse direction by displacement along the longitudinal holes or then also in the vehicle vertical direction by tightening the screws. This fastening assembly requires a high degree of precision and dexterity of the assembler in the assembly of a vehicle series production, who must both align the bumper beam and at the same time, however, also screw the screws into the threads. This assembly effort is prevented in a second embodiment variant in which the bumper beam is formed in one piece on the headlight housing over several predetermined breaking points. It is herein disadvantageous, however, that the headlight is even damaged in the case of a so-called insurance or repair crash, so a collision with an obstacle at only a low speed, and must be exchanged, as here the bumper beam breaks from the headlight housing in the region of the predetermined breaking points.

The object of the present invention is therefore to create a support assembly, a headlight as well as a method of the type referred to at the beginning, by means of which a reliable alignment of the bumper relative to the headlights as well as a simple assembly of the bumper can be implemented.

In order to create a support assembly of the type referred to at the beginning, by means of which a particularly reliable support and a simple assembly of the bumper on the front end region, in particular front module, results, it is provided according to the invention that the bumper beam is supported via at least one respective support element on each associated headlight housing. In other words, the bumper beams each comprise a support element, via which the bumper is supported on the respectively associated headlight, in particular in the vehicle vertical direction (z-direction). In particular, a direct and adjustment-free alignment of the bumper or of the respective join-relevant components relative to one another or to the front end region, in particular front module, is possible, and indeed without additional parts or other operating means. Additionally, an assembly having low tolerance fluctuations is possible. Also, a weight and cost reduction due to the omission of at least one additional part or other operating means is possible. Furthermore, a respective butt joint is achieved by the direct support of the bumper beam on the associated headlight housing which can be designed in particular to be uniform and having low gap dimensions. Also, in the continuous operation of the motor vehicle over its lifetime, these respective butt joints do not change due to the direct support of the bumper on the front module.

In a particularly advantageous exemplary embodiment of the support assembly, the respective support element abuts onto a contact surface provided on the headlight housing in a weight-bearing manner. Due to the simple application and removal of the bumper beam on the headlight housing, the assembly of the bumper is particularly simple. In a preferred embodiment, the preferably flat contact surface is aligned horizontally in the case of an assembled headlight. Due to the incline-free alignment of the contact surface, an automatic displacement of the bumper along the same is prevented.

The support of the bumper on the headlight by means of the support elements occurs in an advantageous exemplary embodiment only, i.e., therefore exclusively, in the vehicle vertical direction, so in the z direction in the vehicle's own coordinate system. In other words, the bumper is preferably decoupled from the headlight in the vehicle transverse direction (y direction) and in the vehicle longitudinal direction (x direction), such that in the event of a crash, a relative movement between the bumper beam having the bumper cladding applied thereto and the headlight can take place without damage to the headlight, in particular the housing thereof, occurring. The bumper can, as a consequence of force loading caused by an accident, therefore move accordingly with respect to the headlight such that force loading of the headlight which could damage this can be prevented.

In a further embodiment of the invention it has been shown to be advantageous if the support elements are arranged on the bumper beam and in particular are formed on this in one piece. Therefore a bumper beam which is able to be supported in a manner which is particularly simple in terms of production and at the same time is able to be supported on the respective headlight results.

Finally, it has been shown to be advantageous if the stability of the respective receiver of an allocated headlight housing is adapted to the stability of the allocated support element. Such an adaptation of the stability of the headlight-side receiver to the stability of the allocated bumper-side support element can, for example, occur due to the selection of suitable materials and/or wall thicknesses. As a result it can hereby be achieved that damages to the headlight housing in the case of force loading of the bumper caused by an accident are particularly reliably prevented.

The advantages referred to above in connection with the support assembly apply in the same way to the headlight. This comprises a headlight housing having at least one receiver, on which an allocated support element of a bumper beam of a bumper serving to support a bumper cladding is able to be supported. According to the invention, this receiver is executed on the headlight housing in such a stable manner that it bears the bumper with the relatively high weight thereof. This simplifies both the assembly of the bumper and the adjustment of a desired join pattern between the bumper cladding and the headlight.

In a particularly advantageous exemplary embodiment of the support assembly, in which the respective support element is supported on a contact surface provided on a headlight housing in weight-bearing manner, the contact surface is delimited at least on one side by a limiting wall serving as a stop for the support element in the vehicle transverse direction (x direction). It is thereby prevented that, during a transverse movement of the bumper beam, the respective support element thereof slides down from the support on the headlight housing. Furthermore, a certain pre-alignment is also achieved during the assembly.

In an advantageous embodiment, it is provided that the contact surface is delimited in the vehicle transverse direction on both sides by a respective limiting wall. Therefore, the assembly/insertion direction of the support element into the receiver is set which occurs from the front, i.e., in the x direction, and/or from above, i.e., in the z-direction, or by a movement overlapping these two directions.

According to a development of the invention it is provided that the receiver is formed as a shaft which surrounds the allocated support element of the bumper in an assembly position. Using such a shaft, a particularly simple assembly and support of the corresponding bumper-side support element results.

In a preferred embodiment it is provided that the inner dimensions of the shaft which receives the bumper beam support element are adapted to the outer dimensions of the support element received therein in such a way that a relative movement between the support element and the receiver is possible in the vehicle transverse direction (y direction) and/or vehicle longitudinal direction (x direction). The position of the bumper in the z direction/vehicle vertical direction relative to the headlight housing therefore also remains the same in case of a displacement of the bumper relative to the headlight caused by assembly or a crash, while a sliding of the bumper beam in the direction of a passenger compartment and also in the vehicle transverse direction is possible to a certain extent without the headlight thereby being loaded with force.

Furthermore, it is advantageous if the shaft is formed to be conical or tapering in another manner in the insertion direction of the allocated support element. A particularly favorable assembly of the bumper on the respective headlight housing or front end region, in particular front module, hereby results.

The respective receiver of the headlight housing for the associated support element of the bumper is preferably connected to the headlight housing, in particular in one piece, by arrangement of an intermediate part. Due to this intermediate part, a particularly favorable vibration and noise decoupling results.

In a preferred advantageous exemplary embodiment of the headlight, the respective receiver is connected to the headlight housing at least in a vibration-attenuating manner via a flexible support tab. Vibrations occurring during and due to the driving operation of the vehicle are therefore not transferred or are only transferred to an undamaging extent from the bumper or bumper beams to the headlight, in particular the headlight housing, and are otherwise absorbed/compensated for, such that damage to sensitive parts of the headlight, for example coated reflectors and similar, is prevented.

The flexible tab protrudes, in the unloaded state of the bumper assembled on the vehicle, at an angle to a wall of the headlight housing, i.e., between this connection tab and the headlight housing, a free space exists into and out of which the tab can swing in the case of occurring vibrations in order to not or not extensively transfer vibrations from the bumper to the headlight housing connected to the body at least indirectly at the front region.

This flexible support tab can be attached to a limiting wall of the receiver which receives the respective support element or, however, can form this limiting wall of the receiver. In a preferred embodiment, the connection of the flexible tab to the headlight housing is implemented by means of a film hinge, i.e., the tab is formed on the headlight housing, wherein the flexible connection is achieved by corresponding wall thicknesses and formation as well as, if necessary, by corresponding material selection.

Finally it has been shown to be advantageous if the receiver is positioned between each fastening point of the headlight housing on a front end beam of the front module of the motor vehicle. Hereby, an optimum support of the bumper results, in particular in the vehicle vertical direction.

The advantages referred to above in connection with the support assembly according to the invention and the headlight according to the invention apply in the same way to the method. This is distinguished furthermore by a particularly simply and easily reproducible approach.

Further advantages, features and details of the invention result from the following description of a preferred exemplary embodiment as well as by means of the drawings.

DETAILED DESCRIPTION OF THE DRAWINGS

Figure 1A:
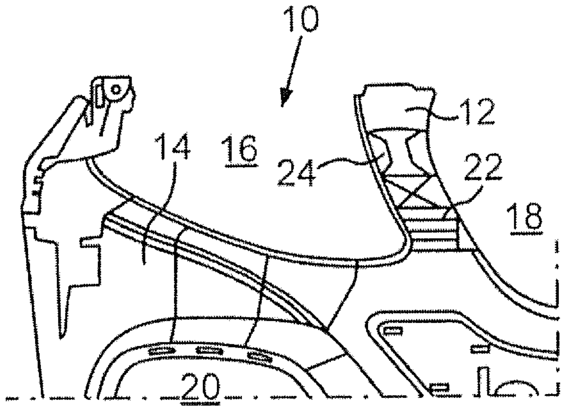
FIG. 1*a*/1*b* is a rear view in sections as well as a lateral sectional view in sections on a bumper for a front module of a passenger motor vehicle having a recognizable bumper beam in sections, which is concealed outside or on the front side by a bumper cladding.
Figure 1B:
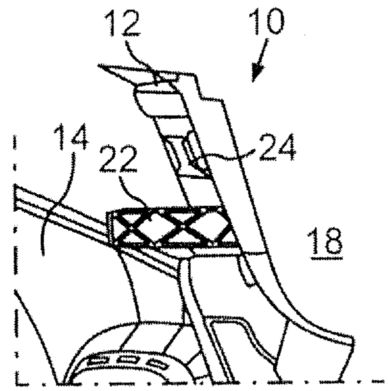

In FIG. 1*a*, in a rear view in sections, and in FIG. 1*b*, in a side view in sections, a bumper 10 for a motor vehicle front of a passenger motor vehicle is depicted. This bumper 10 comprises a partially recognizable bumper beam 12 which is concealed on the outer side by a bumper cladding 14 and bears this. The bumper cladding 14 delimits, among other things, an opening 16 for a left headlight which is explained in more detail below, an opening 18 for cooling air, in which a front grill is inserted, as well as an opening 20 for a lower lighting unit, for example a fog lighting unit.

Figure 4A:
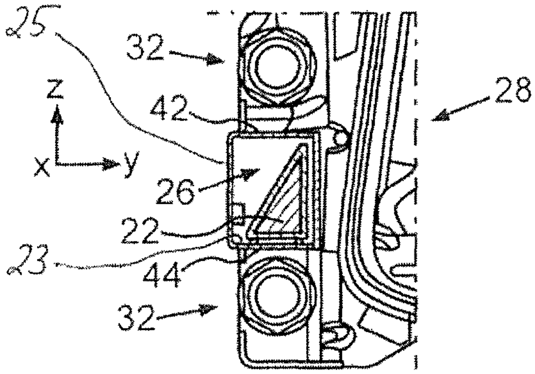
FIG. 4*a*/4*b* is a sectional view in sections along a sectional plane running in the vehicle vertical direction or in .the vehicle transverse direction through the support assembly according to FIGS. 2*a* to 3*b;*

From the bumper 12, one of a total of two support elements 22 from the exemplary embodiment depicted in the figures is recognizable, which projects from a corresponding part 24 of the bumper beam 12, which is produced overall from plastic and in one piece, in the vehicle longitudinal direction, so in the x direction of the vehicle's own coordinate system which is specified in FIG. 4*a*, and approximately horizontally backwards. In other words, the bumper beam 12 comprises an identical second support element 22 on the other vehicle side, here to the right, the support element 22 being allocated to the right headlight. This is not depicted, however, in the figures.

A support assembly of the bumper 10 is created on a front module of the passenger motor vehicle via the respective support element 22, the support assembly in particular being explained below when looking at FIGS. 2*a* to 4*b* together.

Figure 2A:
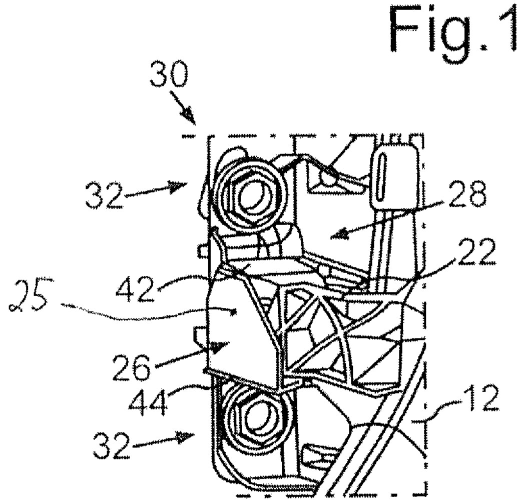
FIG. 2*a*/2*b* is a perspective view in sections as well as a top view in sections onto a support assembly of the bumper on the front module of the passenger motor vehicle in which a respective headlight supported on a front end beam of the front module has a shaft-shaped receiver on which an associated support element of the bumper beam is inserted and is supported here by the bumper in the vehicle vertical direction on the associated headlight.
Figure 2B:
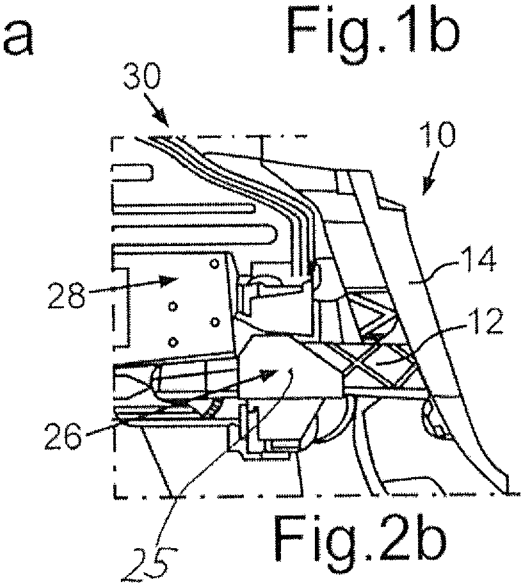
Figure 3A:
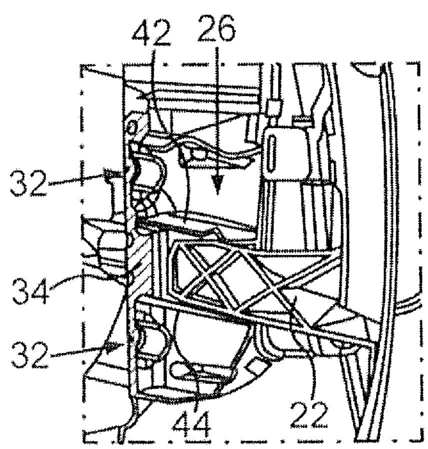
FIG. 3*a*/3*b* is a perspective sectional view in sections and a lateral sectional view onto the support assembly according to FIGS. 2*a* and 2*b;*
Figure 3B:
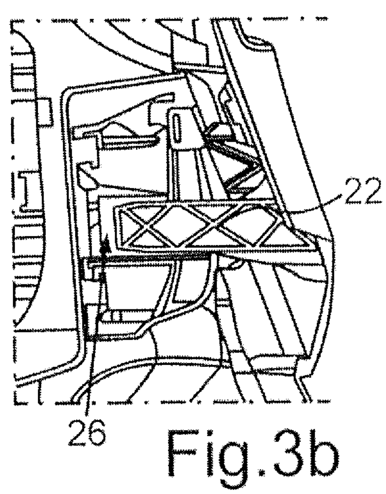

As is particularly recognizable from FIGS. 2*a* to 3*b*, the support element 22 to support the bumper beam 12 or the bumper 10 is inserted altogether into an associated receiver 26 which—as is recognizable in particular in FIGS. 2*a* and 2*b*—is arranged on the inner side of a respective headlight housing 28 of a headlight 30. With the viewing direction in the forward driving direction of the vehicle, the receiver 26 provided on the right headlight is therefore located in the left edge region of the headlight housing thereof and the receiver 26 provided on the left headlight on the right edge region of the headlight housing thereof. Therefore, the two receivers 26 of the headlights are each provided on the side of the respective headlight housing facing towards the vehicle longitudinal central axis and therefore towards a usually provided cooling grill. Here, the respective headlight housing 28 is—as is recognizable in particular in FIGS. 2*a* and 4*a*—fastened to fastening points 32 on a front end beam 34 of the front module which is arranged behind this and is recognizable in FIGS. 3*a* and 3*b*, by means of a plurality of fastening elements. Therefore, the respective receiver 26 of the associated support element 22 of the corresponding headlight housing 28—observed in the vehicle vertical direction (z direction)—is arranged between the two fastening points 32.

The receiver 26 is formed as a shaft according to the exemplary embodiment depicted in FIGS. 3*a* to 4*b*, which surrounds the allocated support element 22 of the bumper beam 12 on the outer peripheral-side in the assembly position shown here.

Figure 4B:
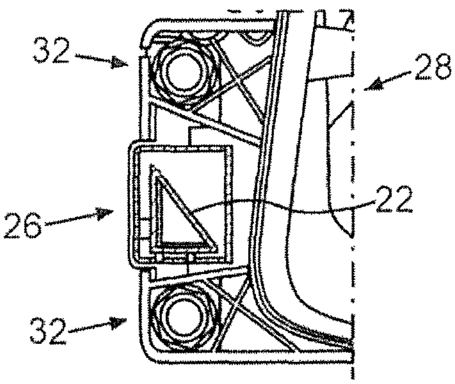

As emerges in particular from FIGS. 4*a* and 4*b*, which show the support assembly in a rear view or a front view, the respective support element 22 which is approximately triangular in cross-section is received within the rectangular, shaft-like receiver 26, wherein the support element 22 is presently only supported in the vehicle vertical direction (z direction) on the headlight housing 28. The arm-like support element 22 can, however, be moved relative to the receiver 26 in the vehicle transverse direction (y direction) and in the vehicle longitudinal direction (x direction). Lateral limiting walls 25 and 27 of the shaft of the receiver 26 restrict this tolerance movement. The floor of the receiver 26 or of the shaft is formed by a flat surface which is arranged horizontally or at least substantially horizontally in the state of the headlight mounted on the vehicle, so lies in an imaginary plane spanning in the x and y direction of the vehicle. This surface is referred to below as a contact surface 23, as the respective support element 22 of the bumper beam 12 and therefore the entire bumper 10 is supported in a weight-bearing manner on this surface.

As specified to some extent in FIG. 4*b*, the support element 22 is not supported over the whole surface on the contact surface 26 of the headlight housing 12, but rather has several sections which have similar power and are at a distance from one another, which reduces the effective contact surface between the support element 22 and the receiver 26 such that the adhesive force is reduced accordingly and the assembly is possible with a lower force expenditure.

It is found that the bumper 10 is therefore supported to the left and right by means of its bumper beam 12, in the present case with two support elements 22 on each corresponding receiver 26 of the respective headlight housing 28 of the corresponding headlight 30. Due to this support in the vehicle vertical direction (z direction), an optimum positioning of the bumper 10 and in particular of the bumper cladding 14 relative to the headlights 30 results, and indeed in particular with respect to the headlight housing 28 and a headlight cover inserted into the respective opening 16 which is not presently depicted. The headlight cover that is usually formed in the shape of a panel or cover disc has at least one light-permeable region through which the light emitted by a light source can shine. The headlight cover can additionally also be formed as a diffusion disc or function as such.

The respective receiver 26 of the corresponding headlight housing 28 is presently uncoupled from the actual headlight housing 28 as a result of its geometry and wall thickness design, as well as its connection to the headlight housing described below, in order to hereby also prevent damage to the bumper 10 from force loading caused by an accident, and above all, however, in order not to transfer vibrations arising during the driving operation from the bumper beam 12 to the headlight 10, and at least only in suppressed form, so as not to damage sensitive components of the headlight in the normal vehicle operation. Therein the stability of the respective receiver 26 can also deviate in another way with respect to the stability of the allocated bumper-side support element 22, for example by a suitable material selection. It is, however, also significant that the receiver 26 and the corresponding support element 22 are preferably coordinated to each other in such a way that no damage to the headlight housing 28 occurs with respect to the receiver 26 in the case of a force loading and backward displacement of the support element 22 caused by an accident.

Figure 5A:
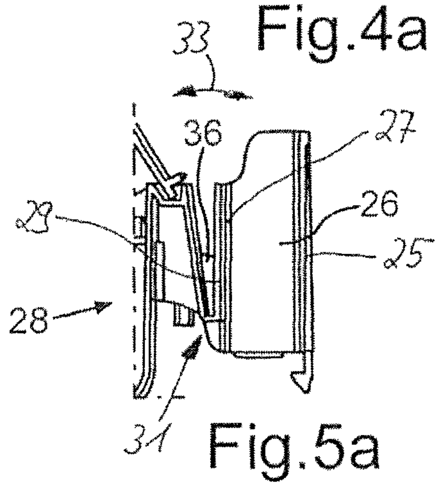
FIG. 5*a*/5*b* is a top view in sections as well as a perspective sectional view in sections along a sectional plane running in the vehicle longitudinal direction through the receiver of the respective headlight housing formed as a shaft, into which the associated support element of the bumper beam is inserted; and in FIG. 6*a*/6*b*/6*c* in each, a lateral sectional view in sections through the corresponding headlight housing and the bumper, wherein the assembly of the bumper on the headlights or the front module is explained in the sequence.
Figure 5B:
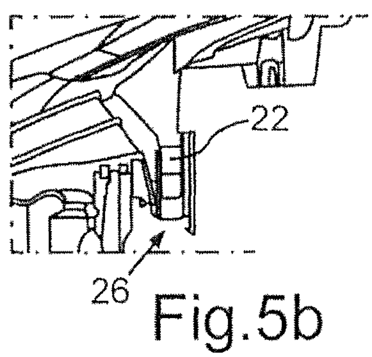

In particular it is additionally recognizable from FIGS. 5*a* and 5*b* that the receiver 26 is presently formed to be tapering in the insertion direction—so in the vehicle longitudinal direction (x direction) from the front to the back. Hereby a particularly favorable and simple introduction of the corresponding support element 22 can be ensured. The receiver 26 formed as a rectangular shaft in cross-section itself is presently formed in one piece with the headlight housing 28 produced from plastic by arrangement of an intermediate part 36.

This intermediate part 36 is formed, in the exemplary embodiment depicted in the figures, by a support tab 29 which is connected to or is formed to be flexible and in one piece with the base body of the headlight housing 28 via a relatively stiff bending section 31 which is similar to a film hinge. According to the depiction of FIG. 5*a*, the bending/ hinge axis runs perpendicularly to the image plane of this figure and therefore in the vehicle vertical direction (z direction) and perpendicularly to the insertion direction of the bumper beam-side support element in the headlight-side receiver. This assembly and design of the connection of the receiver 26 on the headlight housing 28 has the advantage that the receiver 26 is at least predominantly decoupled in terms of vibrations from the headlight housing 28, i.e., the flexible support tab 29 at least attenuates, preferably absorbs the vibrations introduced by the bumper so that these are not transferred to the headlight housing 28 or are only transferred without causing damage. This occurs by a vibration-attenuating compensation movement of the receiver 26 with respect to the base body of the headlight housing in the direction of a double arrow 33 depicted in FIG. 5*a*. At the same time, however, the stiffness of this connection in the z direction is very high, i.e., the receiver 26 practically cannot tip in the drive direction and opposite direction, so around an axis running in the vehicle transverse direction.

In a particularly advantageous exemplary embodiment it is provided that the support tab 29 and the limiting wall 27 of the receiver 26 are formed in one piece with each other and therefore the headlight housing, the bearing 31 (bending region), the support tab 29 and the limiting wall are designed in one piece.

Figure 6A:
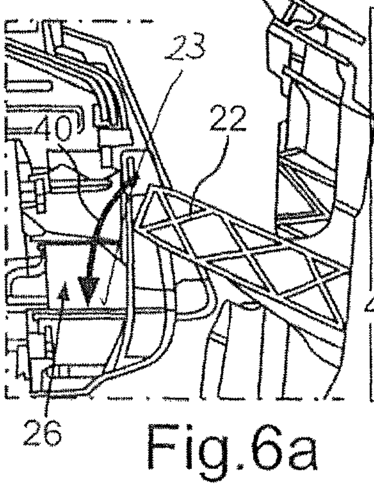
Figure 6B:
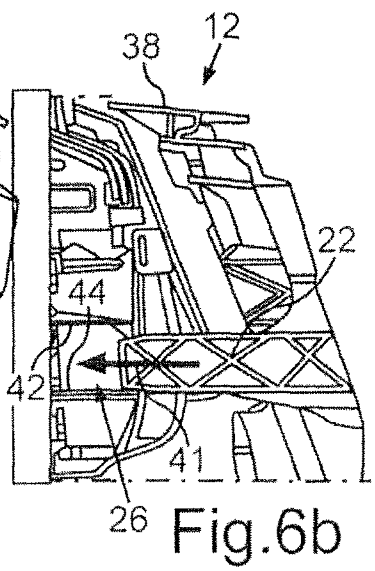
Figure 6C:
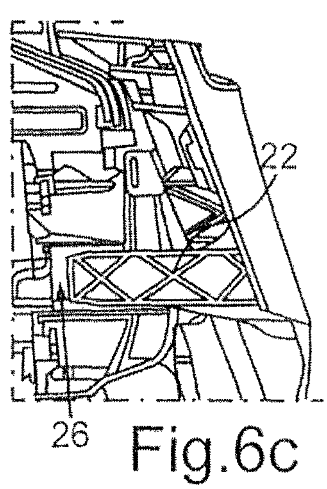

By means of FIGS. 6*a* to 6*c*, a possible sequence of the assembly of the bumper 10 or for the production of the support assembly of the bumper 10 on the front module is finally to be discussed.

According to FIG. 6*a*, for this purpose, firstly the bumper 10 is positioned in front of the front end beam 34 and indeed in such a way that the bumper beam 12 or the bumper 10 is orientated in a position which is tipped forward with its upper end 38 in the vehicle longitudinal direction (x direction). From this position, the bumper 10 or the bumper beam 12 is tipped anticlockwise in the viewing direction according to the arrow 40 in such a way that the upper front end 38 is moved backwards in the vehicle longitudinal direction (x direction), so in the direction towards the vehicle front. Due to this tipping, the respective support elements 22 are screwed into respectively higher headlight-side receivers 26. The respective shaft of the receiver 26 is thus—as is recognizable in particular in FIGS. 2*a* and 2*b*—formed to spring back in the region of an upper wall 42 such that the screwing-in of the support elements 28 into the respectively allocated 26 is possible until the respective support element 22 appears on a lower wall 44 of the respective shaft of the receiver 26.

According to FIG. 6*b*, in connection to this—as specified by the arrow 41—the respective support element 22 can be pushed into the allocated receiver 26 of the headlight.

FIG. 6*c* shows the support assembly after the end of the assembly procedure, wherein the bumper 10 is supported by arrangement of the respective support elements 22 on the allocated receivers 26 in the vehicle vertical direction (z direction), whereas the bumper 10 is also able to move freely in the vehicle transverse direction (y direction) and in the vehicle longitudinal direction (x direction) in order to enable an optimum positioning of the bumper 10 relative to the remaining components of the front module.

In summary it is found that a z-support of the bumper at the front in the front module, more exactly of the bumper beam on the headlight housing fastened on the body side, is able to be achieved by means of the support assembly according to the invention and the headlight according to the invention, in the case of which movement vectors of the bumper are free in the y/x direction. As described above by means of a preferred exemplary embodiment depicted in the figures, an optimum vibration and also noise decoupling during the vehicle operation is able to be achieved without a problem to prevent force introduction from the bumper into the headlight housing. It is furthermore particularly advantageous that a direct and adjustment-free orientation of the join-relevant components thereby occurs without additional parts or operating means, for example of an assembly gauge, in a simple manner, in that the bumper beam is removed or placed on the headlight housing.

The invention claimed is:

1. A support assembly of a bumper on a front end region of a motor vehicle, comprising:

a front end beam having a headlight which is supported on the front end beam and wherein the headlight has a headlight housing;

a bumper cladding which is supported by a bumper beam; and integrally formed with the bumper beam, an arm-like support element which projects horizontally backwards from the bumper beam, wherein the bumper beam is supported via the arm-like support element on the headlight housing of the headlight, wherein the arm-like support element is supported on a receiver of the headlight housing which is open and/or at least partially open in a vehicle longitudinal direction at a front of the motor vehicle, wherein the receiver is a shaft and an inner dimension of the receiver is adapted to an outer dimension of the arm-like support element such that a relative movement is possible between the arm-like support element and the receiver in a vehicle transverse direction and in the vehicle longitudinal direction, and wherein the bumper beam is supported on the headlight via the arm-like support element only in a vehicle vertical direction.

2. The support assembly according to claim 1, wherein the arm-like support element is supported on a contact surface of the headlight housing which runs horizontally.

3. The support assembly according to claim 2, wherein the contact surface is delimited on one side by a limiting wall which is a stop for the arm-like support element in a vehicle transverse direction.

4. The support assembly according to claim 1, wherein the receiver is connected to the headlight housing at least in a vibration-attenuating manner via a flexible support tab.

5. The support assembly according to claim 1, wherein the arm-like support element is formed in one piece with the bumper beam.

6. The support assembly according to claim 1, wherein the arm-like support element has an approximately triangular cross-section.

7. A headlight for a motor vehicle, comprising:

a headlight housing;

wherein the headlight housing includes a receiver and wherein an arm-like support element of a bumper beam of a bumper, which projects from the bumper beam, wherein the bumper beam supports a bumper cladding, is supportable on the receiver, wherein the receiver is a shaft which surrounds the arm-like support element in an assembly position of the headlight, wherein the shaft is tapered in an insertion direction of the arm-like support element, and wherein the bumper beam is supported on the headlight via the arm-like support element only in a vehicle vertical direction.

8. The headlight according to claim 7, wherein the receiver has a contact surface for the arm-like support element for weight-bearing support of the arm-like support element.

9. The headlight according to claim 7, wherein an intermediate part is disposed between the receiver and the headlight housing.

10. The headlight according to claim 7, wherein the receiver is positioned between respective fastening points of the headlight housing on a front end beam of a front module of the motor vehicle.

11. The headlight according to claim 7, wherein the arm-like support element has an approximately triangular cross-section.

12. A method for production of a support assembly of a bumper on a front end region of a motor vehicle which has a front end beam with a headlight supported thereon and a bumper cladding of the bumper supported by a bumper beam, comprising the steps of:

positioning of the bumper in front of the front end beam with the headlight supported thereon;

tipping of the bumper backwards with its upper end in a vehicle longitudinal direction; and pushing-in and fastening of an arm-like support element of the bumper into a receiver of the headlight, and wherein the arm-like support element is integrally formed with and projects horizontally backwards from the bumper beam, and wherein the bumper beam is supported on the headlight via the arm-like support element only in a vehicle vertical direction.

* * * * *